(No Model.)
T. UTLEY & J. FAWCETT.
VENTILATOR FOR SHIPS.
No. 301,538. Patented July 8, 1884.
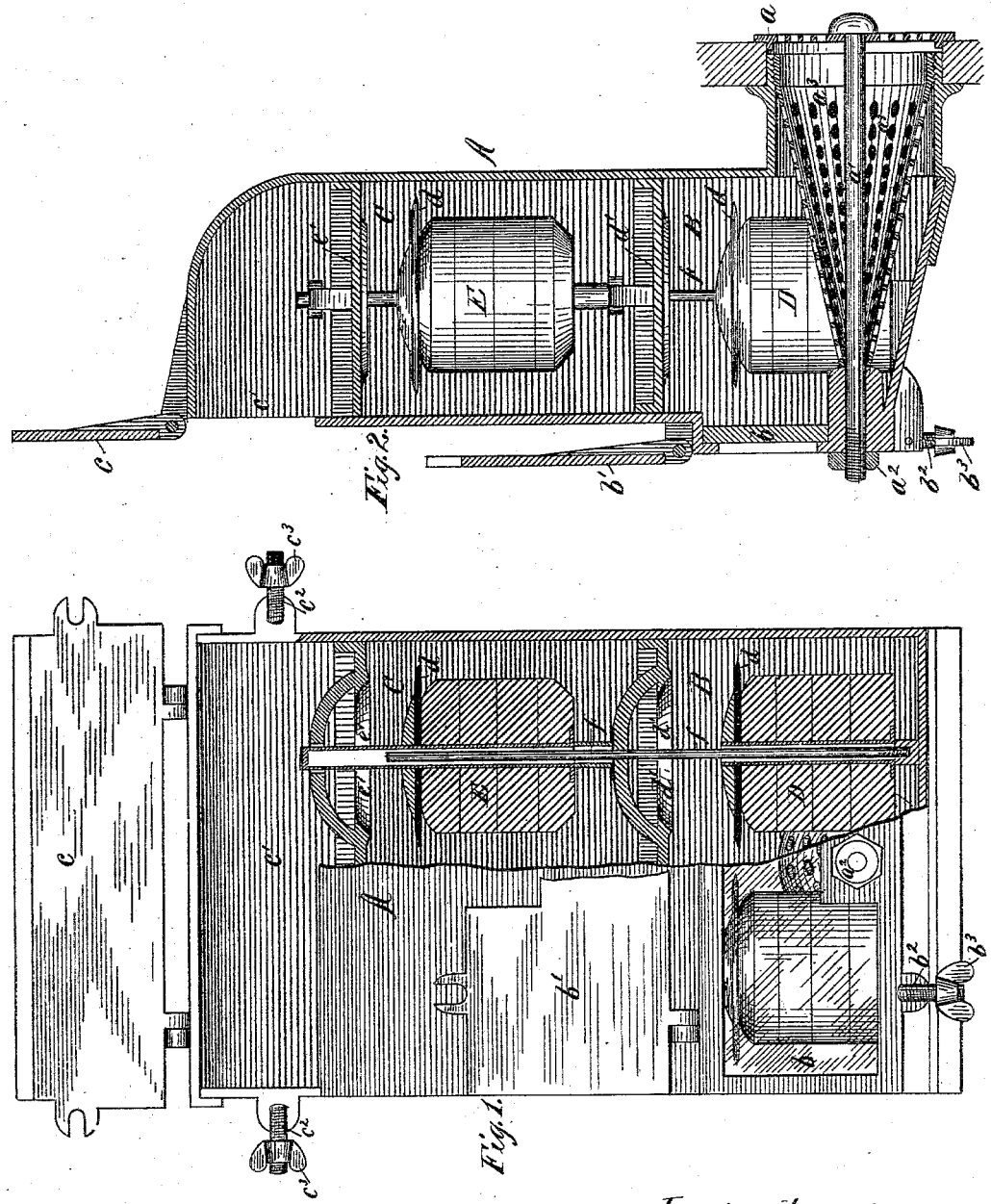
Witnesses:
Wm. A. Copeland.
John R. Snow.
Inventors
Thomas Utley
John Fawcett

UNITED STATES PATENT OFFICE.

THOMAS UTLEY, OF BOSTON, MASSACHUSETTS, AND JOHN FAWCETT, OF BROOKLYN, NEW YORK.

VENTILATOR FOR SHIPS.

SPECIFICATION forming part of Letters Patent No. 301,538, dated July 8, 1884.

Application filed December 23, 1881. (No model.) Patented in England April 18, 1881, No. 1,687.

*To all whom it may concern:*

Be it known that we, THOMAS UTLEY, a subject of the Queen of Great Britain, residing at Boston, in the county of Suffolk and State of Massachusetts, and JOHN FAWCETT, a subject of the Queen of Great Britain, and now residing at Brooklyn, in the county of Kings and State of New York, have jointly invented a new and useful Improvement in Ventilators for Ships, (for which we have obtained English Letters Patent No. 1,687, dated April 18, 1881,) of which the following is a full, clear, and concise description, reference being had to the accompanying drawings, in which—

Figure 1 is an inboard elevation, partly in section; and Fig. 2, a vertical section showing the ventilator embodying our invention.

In the drawings, B and C represent two chambers in casing A.

D and E represent valves, made, preferably, of cork, and mounted, as shown, upon guide-rod $f$. The casing A is securely attached to an air-port of the vessel, or to any other air-passage, one convenient means being the strong perforated plate $a$ on the outside of the air-port, and a screw-bolt, $a'$, and nut $a^2$, as shown in Fig. 2. The plate $a$ and perforated cover $a^3$ serve as breakwaters, and also as strainers. Disks $d$, of vulcanized rubber, serve to make the valves D E fit their seats better. The chamber B has a plate of glass, $b$, in it, in order that light may enter through it. The cover $b'$ can be securely fastened over the glass $b$ by means of the screws $b^2$ and thumb-nuts $b^3$, should occasion require. The cover $c$ can be used to cover the mouth $c'$ of casing A by means of screws $c^2$ and nuts $c^3$. When the valves D E are as shown in the drawings, air has free passage through the air-port valve-openings $d'$ $e'$ and mouth $c'$; but when the air-port is submerged the inflow of water will lift valve D, and any water that escapes past valve D into chamber C will close valve E. When the water escapes from chambers B and C, the air will again have free passage through the ventilator. The rod $f$ passes through valve D, and is firmly held both above and below that valve, so that the rush of the water into chamber B shall not bend rod $f$, as would be likely to happen were rod $f$ not firmly held below as well as above the valve.

The apparatus above described is strong and simple, allows the passage of both light and air, and can be closed water-tight by means of the covers $c$ and $b'$ should the valves become deranged.

What is claimed as our invention is—

1. The improved ship's ventilator herein described, consisting of a casing, A, with its outward opening attached to an air-port, and its inward opening provided with a cover, $c$, and divided by partitions into the chambers B C C', the partitions having openings $d'$ $e'$, controlled by the float-valves D E, acting independently of each other, to close these openings when water enters the casing, substantially as and for the purposes set forth.

2. In a ship's ventilator, a casing provided with partitions having openings $d'$ $e'$, in combination with the independent float-valves D E, the lower valve, D, sliding on a rod, $f$, passing through it and attached to the casing both above and below it, as set forth.

THOMAS UTLEY.
JOHN FAWCETT.

Witnesses:
 WILLIAM RHODES,
 WILLIAM PIERCE.